(12) United States Patent
Graff et al.

(10) Patent No.: US 10,798,315 B2
(45) Date of Patent: Oct. 6, 2020

(54) REMOVAL OF INTERFERENCE OF ABSORBERS FROM INTENSITY DATA

(71) Applicant: Owens-Brockway Glass Container Inc., Perrysburg, OH (US)

(72) Inventors: Stephen M. Graff, Maumee, OH (US); Karl Johnston, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 16/290,347

(22) Filed: Mar. 1, 2019

(65) Prior Publication Data

US 2020/0280687 A1 Sep. 3, 2020

(51) Int. Cl.
| H04N 5/33 | (2006.01) |
| G06T 5/00 | (2006.01) |
| G06T 5/50 | (2006.01) |
| G01J 5/28 | (2006.01) |
| G01J 5/00 | (2006.01) |

(52) U.S. Cl.
CPC ............... *H04N 5/33* (2013.01); *G01J 5/28* (2013.01); *G06T 5/002* (2013.01); *G06T 5/50* (2013.01); *G01J 2005/0077* (2013.01); *G01J 2005/283* (2013.01); *G06T 2207/10048* (2013.01); *G06T 2207/20216* (2013.01)

(58) Field of Classification Search
None
See application file for complete search history.

(56) References Cited

U.S. PATENT DOCUMENTS

| 3,759,102 | A | 9/1973 | Murray | |
| 3,988,139 | A | 10/1976 | Goodwin | |
| 6,477,862 | B1 | 11/2002 | Wacke | |
| 6,639,166 | B1 | 10/2003 | Welker et al. | |
| 6,743,998 | B2 | 6/2004 | Welker et al. | |
| 7,350,379 | B2 | 4/2008 | Ueda et al. | |
| 9,563,957 | B1* | 2/2017 | Choi | G06T 7/586 |
| 2007/0296838 | A1* | 12/2007 | Erdtmann | H04N 5/33 348/243 |
| 2011/0247363 | A1* | 10/2011 | Dalstra | C03B 7/005 65/29.1 |
| 2011/0297828 | A1* | 12/2011 | Weisbach | H04N 5/33 250/330 |
| 2012/0310578 | A1 | 12/2012 | Solheim | |
| 2013/0077650 | A1* | 3/2013 | Traxler | G01N 25/72 374/5 |
| 2018/0059014 | A1* | 3/2018 | Ruback | G01N 21/3563 |
| 2020/0029059 | A1* | 1/2020 | Chahine | G06T 5/40 |

FOREIGN PATENT DOCUMENTS

JP 07089735 A 4/1995

* cited by examiner

*Primary Examiner* — Rebecca A Volentine

(57) ABSTRACT

A method for thermal imaging includes extracting pixel intensity data from a plurality of images corresponding to electromagnetic radiation emitted from one or more targets, creating an array for each image pixel in the plurality of images, wherein each pixel array represents a distribution of intensity data from corresponding pixels in each of the images, removing from each pixel array an amount of intensity data such that a remaining amount of intensity data represents an approximate equivalent to a distribution of intensity data uncontaminated by interference; and generating a thermal image representing the one or more targets based on the remaining amount of intensity data in each pixel array.

19 Claims, 1 Drawing Sheet

REMOVAL OF INTERFERENCE OF ABSORBERS FROM INTENSITY DATA

The present disclosure is directed to glass manufacturing and, more particularly, to determining the thermal characteristics of glass gobs as they travel through a glass forming machine.

BACKGROUND

Glass products (e.g., containers) are produced in molds from glass gobs sheared from streams of molten glass. The molten glass is produced by a glass feeder at the end of a forehearth of a glass melting furnace. The glass gobs are created by a shearing mechanism that shears the molten glass stream as it exits the feeder. The glass gobs are then directed through a series of funnels or other path directing mechanisms into a mold that forms the glass product. The physical characteristics of the glass gobs prior to reaching the molds can affect the quality and formation of the final product, and therefore, are monitored by various system processes. One of these monitored characteristics is the temperature of the glass gobs as they leave the feeder.

In a molten state, the glass gobs emit electromagnetic radiation that can be measured by non-contact thermometers to determine the surface temperature of the gobs. More specifically, the non-contact thermometers evaluate the intensity or spectral radiance of the glass gobs by intercepting and measuring the emitted thermal radiation.

In a manufacturing environment, water or other liquid sprays are often used to cool machine components such as the shears and funnels. These sprays can cause interference in the glass gob temperature measurements in that falling droplets of liquid are often present between the glass gobs and the thermometer sensor. These liquid droplets lower the intensity of the electromagnetic radiation that reaches the sensors by absorbing the radiation, refracting the radiation, or both. The interference of these liquids causes a precipitous drop in the detected temperature, and thus, distorts the accuracy of the glass gob temperature measurements.

Known systems attempt to avoid the liquid droplet interference by triggering the sensors at different times or measuring from different angles to avoid the contamination and/or to identify and throw out the contaminated images. This approach, however, is not always possible.

BRIEF SUMMARY OF THE DISCLOSURE

The present disclosure embodies a number of aspects that can be implemented separately from or in combination with each other.

In accordance with one aspect of the disclosure, a method for thermal imaging includes the steps of: extracting pixel intensity data from a plurality of thermal images corresponding to electromagnetic radiation emitted from one or more targets; creating an array for each image pixel in the plurality of images, wherein each pixel array represents a distribution of intensity data from corresponding pixels in each of the images; removing from each pixel array an amount of intensity data such that a remaining amount of intensity data represents an approximate equivalent to a distribution of intensity data uncontaminated by interference; and generating a thermal image representing the one or more targets based on the remaining amount of intensity data in each pixel array.

In accordance with another aspect of the disclosure, a method for generating a thermal image of a glass gob includes the steps of: extracting pixel intensity data from a plurality of images corresponding to electromagnetic radiation emitted from one or more glass gobs; generating an array of intensity data for each representative pixel in the plurality of images, wherein each array represents a distribution of intensity data from corresponding pixels in each of the images; filtering the intensity data in each array to exclude an amount of intensity data such that a remaining amount of intensity data represents an approximate equivalent to a distribution of intensity data uncontaminated by interference; and generating a thermal image of a glass gob based on the remaining amount of intensity data in each array.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

The system and method described below are directed to generating a thermal image representing a temperature profile of a glass gob in a glass forming process, and more particularly, to removing from the thermal image the influence of environmental interference, also referred to as contamination. In one example, the environmental interference is due to ambient liquid droplets that intercept thermal radiation from the glass gob prior to reaching the thermal sensing device. Stated differently, the liquid droplets interfere with the sensing device by absorbing and/or refracting the radiation emitted from the glass gob. Consequently, successive images of the glass gobs taken from the sensors will have liquid droplet interference in different places. The disclosed method removes this interference by finding regions in each image that are free of the influence of the droplets (i.e., free of contamination), and then combines those interference free regions to generate a thermal image of the whole glass gob. More specifically, in recognizing that the liquid droplets cause a lowering of the measured temperatures, the method builds a glass gob image or temperature profile from images with only the highest temperatures measured for each pixel.

In one implementation, this is accomplished by capturing a plurality of successive glass gob images and creating an array for each pixel in the image. The arrays contain the temperature measurements for that pixel for each of the acquired images. The pixel arrays are then sorted from highest to lowest according to the magnitude of each temperature measurement. The lowest temperatures are discarded, and the remaining temperatures are averaged and a standard deviation (a) is calculated. Standard deviation and statistics information from uncontaminated measurements taken without liquid droplets are known and can be used to obtain the amount of data for inclusion when generating the final glass gob image. Thus, an interference free image representing the thermal characteristics of the glass gobs is generated based on the remaining non-discarded data, and more particularly, based on the calculated average for each image pixel.

In another implementation, the method may be accomplished by capturing multiple images of a single glass gob and creating an array for each pixel in the multiple images. Capturing multiple images of a single glass gob as it falls allows for discrimination of single gobs if the interference (the liquid droplets) and the glass gobs were falling at different rates due to air resistance.

Figure 1:
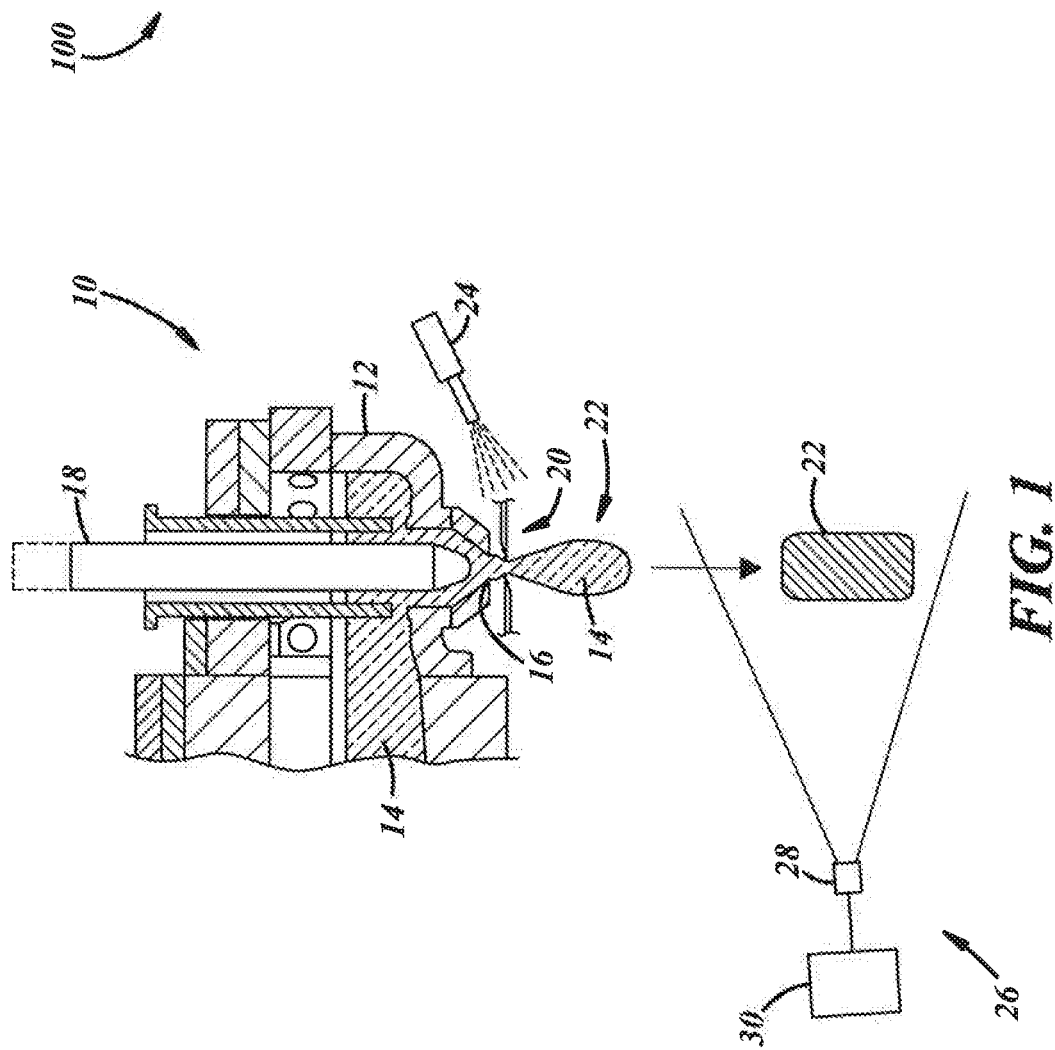
FIG. 1 is a cross-sectional side view of an apparatus that creates glass gobs and incorporates one embodiment of the disclosure.

FIG. 1 illustrates a portion of a system for forming glass containers in accordance with an exemplary embodiment of the present disclosure. The system includes a glass gob feeder 10 positioned at a downstream end of a forehearth of a glass melting furnace. The gob feeder 10 includes a spout 12 filled with molten glass 14 that is released in a calculated fashion through an outlet 16. When a plunger 18 is actuated to squeeze the molten glass 14 out of the outlet 16, a shear mechanism 20 is activated to cut off the molten glass 14 as it exits the outlet 16 creating a glass gob 22. The glass gob 22 falls from the gob feeder 10 and is then directed through a series of funnels, spindles, scoops, troughs, and the like, to reach the molding section of the operation (none of these elements are shown in this Figure for purposes of simplicity).

The system may also include one or more water spray units 24 used to cool machine components such as the shears and funnels by periodically ejecting a mist of water or other cooling fluid thereon. The system may further include a gob imaging device 26 configured to measure the thermal characteristics of the glass gob 22, and to generate a thermal image thereof, as the glass gob 22 falls through a measurement region located between the exit of the gob feeder 10 and the molding sections. The gob imaging device 26 includes a sensing device 28 configured to measure the electromagnetic radiation emitted from the glass gob 22. The sensing device 28 may include, without limitation, any combination of thermometers, sensors, and/or charge-coupled devices (CCDs) capable of detecting, measuring, and/or evaluating on a pixel-by-pixel basis the intensity of the thermal radiation emitted from the glass gob 22. In one non-limiting example, the sensing device 28 may be a linescanning device having a one-dimensional sensing array, or a focal plane array sensor having a two-dimensional sensing array. In addition, the sensing device 28 may include spot sensors (e.g., spot pyrometers) that can used to build temperature profiles that reflect a line of temperatures along the glass gob as the gob transits past the spot sensor. Yet in another non-limiting example, the sensing device 28 may incorporate three-dimensional sensing such as, but not limited to, a scanning spectrometer or any other imaging system that acquires a spectrum for each pixel. For ease of explanation, the example shown in FIG. 1 shows only one sensing device 28, however, one of ordinary skill in the art appreciates that the gob imaging device 26 may include two or more of any combination of suitable sensing devices 28.

Those of ordinary skill in the art will recognize that the sensing device 28 may include built-in processors and memory configured to receive and process the thermal radiation data in accordance with the method and/or algorithm disclosed herein. Alternatively, as shown in FIG. 1, the gob imaging device 26 may include a stand-alone processing device 30 having a processor and memory communicatively coupled to the sensing device 28 and configured to carry out the method and/or algorithm's disclosed herein. The processor may include, for example, one or more microprocessors, microcontrollers, discrete logic circuits having logic gates for implementing logic functions on data signals, application specific integrated circuits with suitable logic gates, programmable or complex programmable logic devices, programmable or field programmable gate arrays, and/or any other suitable type of electronic processing device(s). The memory may include any computer readable medium or media configured to provide at least temporary storage of at least some data, data structures, an operating system, application programs, program modules or data, and/or other computer software or computer-readable instructions that provide at least some of the functionality of the system and that may be executed by the processor. The memory may be in the form of removable and/or non-removable, volatile memory and/or nonvolatile memory illustrative volatile memory may include, for example, random access memory (RAM), static RAM (SRAM), dynamic RAM (DRAM) including synchronous or asynchronous DRAM, and/or the like, for running software and data on the processors.

The processing device 30 is configured to receive from the sensing device 28, on a pixel-by-pixel basis, image data representing the intercepted electromagnetic radiation detected from the glass gob 22. The image data is converted by the processing device 30 into an electrical signal that is proportional to the spectral radiance emitted from the glass gob 22. In one embodiment, the thermal radiance signal is converted into a current and/or voltage that is proportional to temperature. The processing device 30 is further configured to generate a thermal image of the glass gob 22 based on the image data. Depending on the type of sensing device 28, the thermal image may be generated from a collection of linescans of the glass gob 22 captured using a one-dimensional array, or, in the case of a two-dimensional sensing array, the entire image of the glass gob 22 may be captured as a whole as the glass gob falls through the field-of-view of the sensing device 28.

Figure 2:
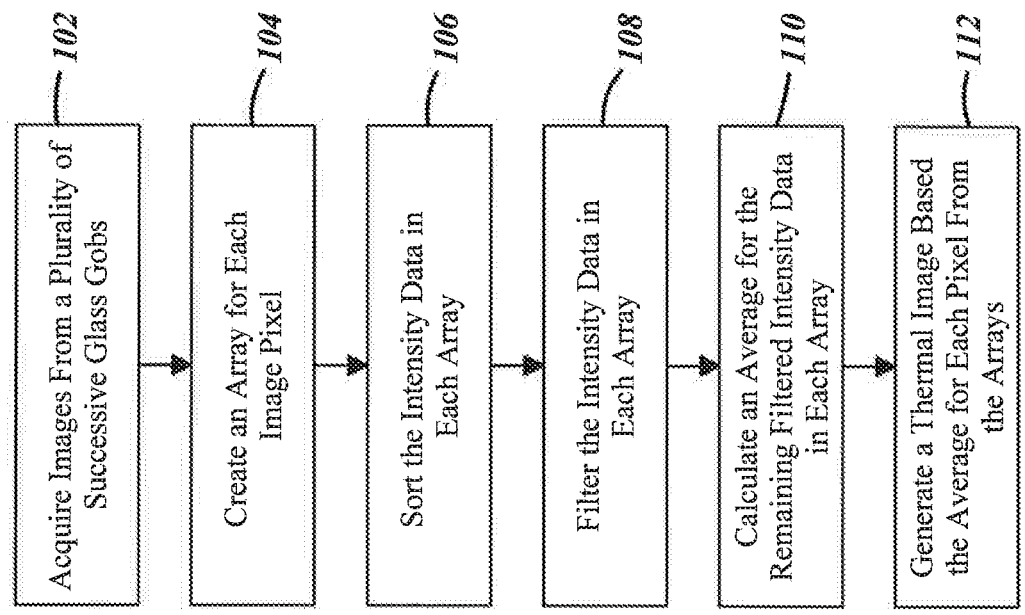
FIG. 2 is a flow chart depicting an exemplary method for removing interference and generating a thermal image of a glass gob according to the system described above in FIG. 1.

FIG. 2 illustrates a flow chart for an exemplary method 100 for removing interference and generating a thermal image of a glass gob using the system described above in FIG. 1. The disclosed method utilizes the reproducibility of the manufacturing process in that the temperature from one glass gob to another remains substantially constant. In other words, the thermal characteristics and temperature profile between successive glass gobs 22 as they exit the gob feeder 10 in a typical system should be substantially the same. While the temperature of the molten glass in the feeder 10 may be adjusted, the resulting change in temperature to the glass gobs 22 is gradual, and thus, there is generally no rapid differential between successive glass gobs 22 as they exit the feeder 10.

It should be understood that the steps of the method 100 are not necessarily presented in any particular order and that performance of some or all the steps in an alternative order is possible and is contemplated. The method 100 begins at step 102 by acquiring images from a plurality of successive glass gobs 22 as they exit the glass gob feeder 10. Alternatively or concurrently, multiple images of a single glass gob 22 may be acquired. As set forth above, the images are thermal images captured using the gob imaging device 26 and represent the electromagnetic radiation emitted from the plurality of glass gobs 22. At step 102, intensity data is extracted from each pixel in the successive images. The intensity data from each image pixel corresponds to a surface temperature for that pixel location on each of the plurality of successive glass gob images or from the multiple single gob images. Thus, the captured thermal image provides a temperature profile for each successive glass gob 22 or for each captured image of a single glass gob 22. At step 104, an array of intensity data is created for each image pixel from the captured glass gob images. By way of example, for a particular sensing interval wherein 10 images are acquired, and wherein each image contains 500 pixels, 500 pixel arrays are created, one for each image pixel. Each array contains 10 intensity (temperature) values, one for each acquired image.

At step 106, the intensity data within each array is sorted according to intensity magnitude. At step 108, the intensity data is filtered to remove an amount of data that returns a filtered distribution of pixel data to an approximate equivalent of an uncontaminated distribution. Using one approach, the data may be filtered so that a percentage of the intensity data within each array is discarded to exclude intensity data having a low intensity magnitude relative to other intensity magnitudes in the pixel array. The low intensity magnitudes in each array are assumed to represent interference from liquid droplets. In one implementation, the non-discarded intensity data is approximately between 20%-60% of the overall intensity data.

Filtering the intensity data in step 108 may also include other statistical methods of filtering anomalous intensity data from each array. These methods may include, without limitation, excluding intensity data that is: 1) below a calculated mean of the intensity data; 2) more than 1, 2, or 3σ below the mean, wherein σ is the standard deviation; 3) more than a set value or threshold value below the mean; or 4) below a calculated median of the intensity data. In addition, the intensity data may be filtered by rounding all the data to a set decimal place (e.g., the nearest degree Celsius) and use the most common mode as the composite data point for a particular pixel.

At step 110 an average is calculated for the non-discarded intensity data in each pixel array. The disclosed method exploits a pixel array's distribution, which can be characterized with a fewer percent of included data in comparison to the original acquired data. As the amount of inclusion data approaches an uncontaminated distribution, a final result is obtained. The average temperatures for varying levels (i.e., percentages) of included data rise quickly through the exclusion of small amounts of the lowest data. A plateau is generally reached at a 20-60% inclusion level. For example, if the target temperature range of a glass gob of a specific type, size and weight is 1153° C.±3° C., then a is the characteristic standard deviation in that region for an uncontaminated sample of that specific glass gob. After this region, e.g., at an inclusion level of less than 20%, the average value begins to rise again as the lower part of the uncontaminated distribution is excluded. This, however, will exclude valid data and reduce the standard deviation. This is reflected in decreasing the standard deviation below the uncontaminated level that the detector has combined with the natural variation in the samples. Thus, the properties of the distributions can be used as an indication of when the proper amount of data has been excluded and that the actual percentage excluded is not extremely critical.

At step 112, a thermal image is generated based on the non-discarded intensity data in each pixel array, wherein the thermal image is representative of the plurality of successive glass gobs 22. More specifically, the thermal image is generated based on the average calculated for each pixel array.

There thus has been disclosed a method of removing interference of radiation absorbers from intensity data to generate a thermal image of glass gobs that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method for generating a thermal image of a glass gob, the method comprising:
   extracting pixel intensity data from a plurality of images corresponding to electromagnetic radiation emitted from one or more glass gobs;
   generating an array of intensity data for each representative pixel in the plurality of images, wherein each array represents a distribution of intensity data from corresponding pixels in each of the images;
   filtering the intensity data in each array to exclude an amount of intensity data such that a remaining amount of intensity data represents a distribution of intensity data uncontaminated by interference; and
   generating a thermal image of a glass gob based on the remaining amount of intensity data in each array.

2. The method set forth in claim 1, wherein the one or more glass gobs is a plurality of successive glass gobs having substantially the same physical characteristics that remain substantially constant between each glass gob in the plurality of successive glass gobs.

3. The method set forth in claim 1, wherein filtering the intensity data includes discarding a percentage of the intensity data within each array to exclude intensity data having a low intensity magnitude relative to other intensity magnitudes in the pixel array, wherein the low intensity magnitudes represent interference.

4. The method set forth in claim 1, wherein filtering the intensity data in each array includes at least one of removing intensity data that is: 1) below a calculated mean of the intensity data; 2) more than 1, 2, or 3σ below the calculated mean, wherein σ is a standard deviation; 3) more than a threshold value below the calculated mean; and 4) below a calculated median of the intensity data.

5. The method set forth in claim 1, wherein filtering the intensity data in each array includes rounding the intensity data to a set decimal place and using a most common mode as a composite data point for a particular pixel, excluding intensity data that is below the most common mode or intensity data that is more than a threshold value below the most common mode.

6. The method set forth in claim 1, wherein the intensity data from each image pixel corresponds to a surface temperature for a location on each of the one or more glass gobs.

7. The method set forth in claim 1, wherein the thermal image represents a temperature profile corresponding to the one or more glass gobs.

8. The method set forth in claim 1, wherein the remaining amount of intensity data is between 20%-60% of the extracted intensity data.

9. The method set forth in claim 1, wherein generating the thermal image includes calculating an average for the remaining amount of intensity data in each pixel array.

10. A method for thermal imaging, the method comprising:

extracting pixel intensity data from a plurality of images corresponding to electromagnetic radiation emitted from one or more targets;

creating an array for each image pixel in the plurality of images, wherein each pixel array represents a distribution of intensity data from corresponding pixels in each of the images;

removing from each pixel array an amount of intensity data such that a remaining amount of intensity data represents a distribution of intensity data uncontaminated by interference; and generating a thermal image representing the one or more targets based on the remaining amount of intensity data in each pixel array.

11. The method set forth in claim 10, wherein removing an amount of intensity data from each pixel array includes discarding a percentage of the intensity data within each array to exclude intensity data having a low intensity magnitude relative to other intensity magnitudes in the pixel array, wherein the low intensity magnitudes represent interference.

12. The method set forth in claim 10, wherein the one or more targets is a plurality of successive targets having substantially the same physical characteristics that remain substantially constant between each target in the plurality of successive targets.

13. The method set forth in claim 10, wherein removing an amount of intensity data from each pixel array includes at least one of removing intensity data that is: 1) below a calculated mean of the intensity data; 2) more than 1, 2, or 3σ below the calculated mean, wherein σ is a standard deviation; 3) more than a threshold value below the calculated mean; and 4) below a calculated median of the intensity data.

14. The method set forth in claim 10, wherein removing an amount of intensity data from each pixel array includes rounding the intensity data to a set decimal place and using a most common mode as a composite data point for a particular pixel, excluding intensity data that is below the most common mode or intensity data that is more than a threshold value below the most common mode.

15. The method set forth in claim 10, further including sorting the intensity data within each array according to intensity magnitude.

16. The method set forth in claim 10, wherein the intensity data from each image pixel corresponds to a surface temperature for a location on each of the one or more targets.

17. The method set forth in claim 10, wherein the thermal image represents a temperature profile corresponding to the one or more targets.

18. The method set forth in claim 10, wherein the remaining amount of intensity data is between 20%-60% of the extracted intensity data.

19. The method set forth in claim 10, wherein generating the thermal image includes calculating an average for the remaining amount of intensity data in each pixel array.

* * * * *